United States Patent
Xi et al.

(10) Patent No.: US 11,599,437 B2
(45) Date of Patent: Mar. 7, 2023

(54) METHOD AND SYSTEM FOR INTELLIGENT FAILURE DIAGNOSIS CENTER FOR BURN-IN DEVICES UNDER TEST

(71) Applicant: Dell Products L.P., Round Rock, TX (US)

(72) Inventors: Yun Xi, Xiamen (CN); Yu Huang Lin, Xiamen (CN); Meng Meng Jiang, Xiamen (CN); Wen Sen Que, Xiamen (CN); Hua Shan Liang, Xiamen (CN); Mu Shou Lan, Xiamen (CN); Zhi Jian Weng, Xiamen (CN); Lang Lin, Xiamen (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/181,975

(22) Filed: Feb. 22, 2021

(65) Prior Publication Data

US 2021/0382801 A1 Dec. 9, 2021

(30) Foreign Application Priority Data

Jun. 9, 2020 (CN) .......................... 202010517586.4

(51) Int. Cl.
*G06F 11/26* (2006.01)
*G06N 7/00* (2006.01)

(52) U.S. Cl.
CPC ............. *G06F 11/26* (2013.01); *G06N 7/005* (2013.01)

(58) Field of Classification Search
CPC ................................ G06F 11/26; G06N 7/005
See application file for complete search history.

(56) References Cited

U.S. PATENT DOCUMENTS 5,557,559 A * 9/1996 Rhodes ............ G01R 31/31719
324/750.05
7,356,430 B2 * 4/2008 Miguelanez ........... G11C 29/56
702/108

(Continued)

FOREIGN PATENT DOCUMENTS

CN 107206592 A * 9/2017 ............ B25J 9/1666
CN 108027911 A * 5/2018 ........... B23K 31/125

(Continued)

OTHER PUBLICATIONS

Ye et al., "Board-Level Functional Fault Diagnosis Using Artificial Neural Networks, Support-Vector Machines, and Weighted-Majority Voting", IEEE Transactions on Computer-Aided Design of Integrated Circuits and Systems, vol. 32, No. 5, May 2013, pp. 723-736 (Year: 2013).*

(Continued)

*Primary Examiner* — Matthew M Kim
*Assistant Examiner* — Indranil Chowdhury
(74) *Attorney, Agent, or Firm* — Terrile, Cannatti & Chambers, LLP; Stephen A. Terrile

(57) ABSTRACT

A mechanism is provided for automatically detecting, diagnosing, transporting, and repairing devices having failed during burn-in testing. Embodiments provide a system that monitors devices undergoing burn-in testing and detecting when a device or a component within a device fails the burn-in test. Embodiments can then alert burn-in-rack monitor personnel of the device failure. Embodiments can concurrently determine the nature of the failure applying a machine learning-based prediction model against log files associated with the failed device. The diagnosis along with a recommended repair strategy can be provided to the repair center as an aid in accelerating the repair process. In addition, the diagnosis can be used to order parts for the repair from a parts depot. In this manner, embodiments can (Continued)

reduce the time for detection, diagnosis, and repair of the failed device.

19 Claims, 3 Drawing Sheets

(56) References Cited

U.S. PATENT DOCUMENTS

| | | | | |
|---|---|---|---|---|
| 7,395,170 | B2 * | 7/2008 | Scott | G05B 23/0229 |
| | | | | 702/182 |
| 7,519,880 | B1 * | 4/2009 | Johnson | G01R 31/2874 |
| | | | | 714/724 |
| 11,187,747 | B2 * | 11/2021 | Kagami | G01R 31/2891 |
| 2005/0066243 | A1 * | 3/2005 | Barevadia | G11C 29/44 |
| | | | | 714/726 |
| 2006/0066293 | A1 * | 3/2006 | Gopal | G11C 29/56016 |
| | | | | 324/750.14 |
| 2013/0305081 | A1 * | 11/2013 | Agnihotram | G05B 23/02 |
| | | | | 714/2 |
| 2015/0067422 | A1 * | 3/2015 | Hamilton | G06F 11/24 |
| | | | | 714/724 |
| 2015/0091594 | A1 * | 4/2015 | Hamilton | G06N 3/02 |
| | | | | 324/754.21 |
| 2016/0131699 | A1 * | 5/2016 | Hamilton | G01R 1/07 |
| | | | | 324/750.01 |
| 2017/0286276 | A1 * | 10/2017 | Herzig | G06F 11/3672 |
| 2018/0293514 | A1 * | 10/2018 | Koseki | G06N 5/04 |
| 2019/0304849 | A1 * | 10/2019 | Cheong | G06N 20/20 |
| 2019/0311290 | A1 * | 10/2019 | Huang | G01R 31/317 |
| 2021/0373070 | A1 * | 12/2021 | Shin | G01R 31/2817 |
| 2022/0026895 | A1 * | 1/2022 | Leitch | G05B 23/024 |
| 2022/0137129 | A1 * | 5/2022 | Ranganathan | G01R 31/2865 |
| | | | | 324/756.02 |
| 2022/0300362 | A1 * | 9/2022 | Toba | G06F 11/0721 |

FOREIGN PATENT DOCUMENTS

| | | | | |
|---|---|---|---|---|
| WO | WO-02075578 | A2 * | 9/2002 | G06N 7/005 |
| WO | WO-2019018929 | A1 * | 1/2019 | G01R 31/2862 |

OTHER PUBLICATIONS

CN-107206592-A; Machine Translation of Chinese Patent Publication (Year: 2017).*

CN-108027911-A; Machine Translation of Chinese Patent Publication (Year: 2018).*

* cited by examiner

METHOD AND SYSTEM FOR INTELLIGENT FAILURE DIAGNOSIS CENTER FOR BURN-IN DEVICES UNDER TEST

BACKGROUND OF THE INVENTION

Field of the Invention

The present invention relates to information handling systems. More specifically, embodiments of the invention relate to automatically detecting, diagnosing, transporting, and repairing devices having failed during burn-in testing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

To provide flexibility in handling various information handling needs, certain information handling systems include a significant variety of hardware and software components configured to process, store, and communicate information (e.g., storage devices, communication devices, power supplies, processors, and the like). In order to verify that these components are working correctly separately and with one another, and to detect early failures in those components, a newly assembled information handling system can be subjected to a burn-in testing procedure. Typical burn-in testing provides electrical testing of the information handling system, using an expected operating cycle that last over a time period equivalent to several days. In addition, thermal and environmental stress screening can be performed. Burn-in testing detects faults that are generally due to imperfections in manufacturing and packaging processes. Such faults can affect one or more components in the information handling system.

When an information handling system fails during burn-in testing, the system is repaired and re-tested. Diagnosing the cause of the burn-in failure and determining the solution to the failure is traditionally performed manually and can consume significant personnel, time, and monetary resources.

SUMMARY OF THE INVENTION

A system, method, and computer-readable medium are disclosed for improving diagnosis, alert, and repair of devices that fail burn-in testing.

In one embodiment, a method for remedying burn-in test failure of devices under test is provided. The method includes monitoring status of one or more devices under burn-in testing, determining that a device under test of a first type of the one or more devices under burn-in testing has failed one or more burn-in tests, and diagnosing one or more causes of the failure of the one or more burn-in tests by the device under test of the first type. The diagnosing is performed using a probabilistic machine learning system train from a historical set of burn-in test failure data of devices of the first type.

In one aspect of the above embodiment, the device under test of the first type includes a first set of components, and the failure of the first burn-in tests is associated with one or more components of the first set of components. In another aspect of the above embodiment, the probabilistic machine learning system includes a Naïve-Bayes classifier. In another aspect the above embodiment, the method further includes instructing the failed device under test to reboot in response to said diagnosing.

In another aspect of the above embodiment, the method further includes, in response to the diagnosing, performing one or more of: alerting a burn-in test center of the failed device under test, requesting one or more failed component replacements from a material handling system, and transmitting the diagnosis regarding the failed device under test to a device repair system. In a further embodiment, the alerting, requesting, and transmitting are performed in parallel. In another further embodiment, the alerting includes transmitting and identification of the failed device under test to a burn-in test personnel. In a further embodiment, the alerting further includes transmitting instructions to an automated guided vehicle to transport the failed device under test to a selected device repair station. In a still further aspect, the method further includes selecting the device repair station for the failed device under test. In another further aspect, the alerting further includes transmitting the identification of the failed device under test to a mobile device associated with the burn-in test personnel. In still another further aspect, the requesting the one or more failed component replacements includes determining recommended repair strategy in response to said diagnosing, determining recommended replacement components associated with the recommended repair strategy, and transmitting and identifier of the recommended replacement components to material handling. In yet a further aspect, the method further includes transmitting instructions to an automated guided vehicle to transport the replacement components to a selected device repair station where the failed device under test is also transported to the selected device repair station. In another further aspect, the diagnosing includes identifying one or more failed components of the failed device under test using a log file associated with burn-in testing of the failed device under test as an input to the probabilistic machine learning system, and identifying one or more repair strategies for the failed device under test in response to said identifying the one or more failed components. In yet a further aspect, the method further includes displaying the diagnosis at a selected repair station where the failed device under test and replacement components are transported to the selected repair station.

Another embodiment provides a system including a processor, a data bus coupled to the processor, a network interface coupled to the data bus and a network, and a non-transitory, computer-readable storage medium embodying computer program code, the non-transitory, computer-readable storage medium being coupled to the data bus. The network interface is configured to communicate via the network with a burn-in test monitoring system, a material handling system, and a device repair system. The burn-in test monitoring system is coupled to one or more devices under burn-in testing. The devices under burn-in testing each include one or more components. The computer program code interacting with a plurality of computer operations and comprising instructions executable by the processor and configured to monitor status of the one or more devices under burn-in testing, determine that a device under test of a first type of the one or more devices under testing has failed one or more burn-in tests, and diagnose one or more causes of the failure of the one or more burn-in tests by the device under test of the first type where said diagnosing is performed using a probabilistic machine learning system train from a historical set of burn-in test failure data of devices of the first type.

In a further aspect of the above embodiment, the system further includes a machine learning accelerator processor, coupled to the data bus, and configured to execute instructions configured for the probabilistic machine learning system. In yet a further aspect, the probabilistic machine learning system includes a Naïve-Bayes classifier.

In another aspect of the above embodiment, the computer program code includes further instructions executable by the processor configured to alert the burn-in test monitoring system of the failed device under test, request one or more failed component replacements from the material handling system, and transmit the diagnosis regarding the failed device under test to the device repair system. In a further aspect the instructions are further configured to determine recommended repair strategy in response to said diagnosing, determine recommended replacement components associated with the recommended repair strategy, and transmit an identifier of the recommended replacement components to the material handling system. In yet another further aspect, the instructions are further configured to identify one or more failed components of the failed device under test using a log file associated with the burn-in testing of the failed device under test as an input to the probabilistic machine learning system, and identify one or more repair strategies for the failed device under test in response to said identifying the one or more failed components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for automatically detecting, diagnosing, transporting, and repairing devices having failed during burn-in testing. Embodiments provide a system that monitors devices undergoing burn-in testing and detecting when a device or a component within a device fails the burn-in test. Embodiments can then alert burn-in-rack monitor personnel of the device failure, while sending an automated guided vehicle (AGV) to the site of the failed device for transport to a repair center. Embodiments can concurrently determine the nature of the failure applying a machine learning-based prediction model against log files associated with the failed device. The diagnosis along with a recommended repair strategy can be provided to the repair center as an aid in accelerating the repair process. In addition, the diagnosis can be used to order parts for the repair from a parts depot, while sending an AGV to the parts depot to transport the replacement parts to the repair center. In this manner, embodiments can reduce the time for detection, diagnosis, and repair of the failed device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. Information handling systems can embody both embodiments of the present invention as well as the devices under test that are managed by such embodiments.

Figure 1:
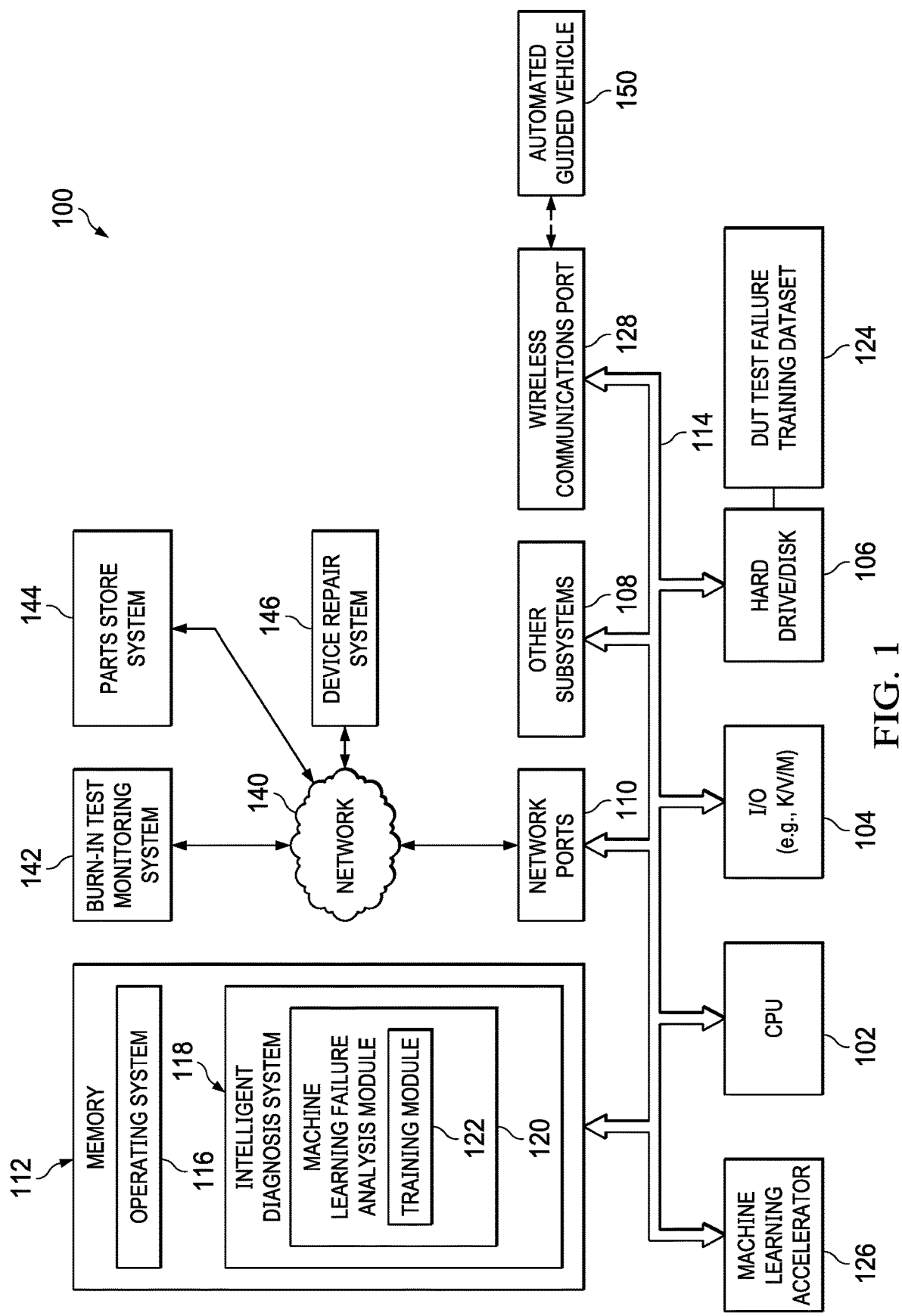
FIG. 1 shows a general illustration of components of an information handling system as implemented in the system and method of the present invention.

FIG. 1 is a generalized illustration of an information handling system 100 that can be used to implement the system and method of the present invention. Information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, information handling system 100 also includes network port 110 operable to connect to a network 140, which is likewise accessible by a burn-in test monitoring system 142, a parts store system 144, and a device repair system 146. In various embodiments, information handling system 100 also includes a wireless communication port 128 operable to communicate via one or more wireless networking protocols with remote devices, including, for example, an automated guided vehicle 150. The information handling system 100 likewise includes system memory 112, which is interconnected to the foregoing via one or more buses 114. System memory 112 further comprises operating system (OS) 116 and in various embodiments may also comprise intelligent diagnosis system module 118.

Intelligent diagnosis system module 118 performs operations associated with monitoring devices being tested at burn-in test monitoring system 142, diagnosing devices failing burn-in testing, ordering replacement parts from parts store system 144 as indicated by the diagnosis, recommending a course of repair to device repair system 146, and, in some embodiments, controlling transportation of the failed device and replacement parts to a device repair location associated with device repair system 146. These operations will be discussed more fully below. Diagnosis operations are performed using machine learning failure analysis module 120 in conjunction with a training module 122. Training module 122 trains the machine learning failure analysis module using a device under test (DUT) test failure training dataset 124 stored in, for example, hard drive/disk 106. In some embodiments, a machine learning accelerator processor 126 is coupled to CPU 102 and memory 112 via buses 114. The machine learning accelerator is configured to execute instructions from machine learning failure analysis module 120 more efficiently than processors associated with CPU 102, and therefore improves performance of the diagnosis functions of intelligent diagnosis system 118 that are described more fully below. In other embodiments, the machine learning instructions are executed by CPU 102 without use of a machine learning accelerator. The use of machine learning to automate device failure diagnosis, along with automatically ordering replacement parts in response to that diagnosis, improves overall efficiency of the burn-in failure and recovery cycle.

As will be appreciated, once the information handling system 100 is configured to perform the intelligent diagnosis operations described above, the information handling system 100 becomes a specialized computing device specifically configured to perform the intelligent diagnosis operations and is not a general purpose computing device. Moreover, the implementation of the intelligent diagnosis operation on the information handling system 100 provides a useful and concrete result of improving efficiency and reducing costs associated with the burn-in failure and recovery cycle.

Burn-in testing for electronic products, such as information handling systems, is a process by which early failures in components of the product are detected, thereby increasing sold component reliability. "Infant mortality" is a period where early failures show up in a component and can be due to issues with manufacturing processes. During this early life period, components can fail at a high rate but the rate decreases with time. In some examples of burn-in, the system and the system's components are exercised under extreme operating conditions (e.g., elevated temperatures and voltages) or for extended periods of time. This stresses the device under test and eliminates the weak populations from the product prior to customer delivery.

During traditional burn-in testing for information handling systems, a burn-in test monitoring system (e.g., burn-in rack monitor) can monitor several information handling systems undergoing test concurrently. Log files, configuration files, and other data records for each of the information handling systems are recorded by the burn-in test monitoring system. If one or more components of the information handling system fails during burn-in testing, burn-in personnel are alerted to the failure by the burn-in test monitoring system. Once a burn-in staff person sees the failure notification, they can go to the failed system, remove the failed system from the burn-in rack and send the failed system to a device repair facility.

Once the failed device arrives at the device repair station, traditionally personnel at the device repair facility begin a manual process of diagnosing the cause of the failure. The log and configuration files from the burn-in test monitor are provided to a technician at the device repair facility, who then uses the information and their experience to diagnose the cause of the failure and determine how to remedy the failure. Once the repair technician diagnoses the failure, the technician can request one or more replacement parts from a material handling station to repair the failed device. When the replacement parts arrive, the device can be repaired by the technician and the device can then be returned to burn-in testing for further testing or testing can be completed at the repair facility.

The traditional process of burn-in testing, transport, diagnosis, ordering replacement parts, and repair of the device can take a significant amount of time. On average, for information handling system burn-in, the time from burn-in failure to complete repair of the system can be over 120 minutes. In a facility where approximately 250,000 units annually fail burn-in testing, this amounts to 500,000 hours of workload annually to detect and remedy burn-in failure, which is a significant consumption of resources of time, money, and personnel. In addition, the requirements that a repair technician be able to diagnose all types of failure results in a significant amount of training of such personnel before they can be fully qualified to work at the device repair station.

Embodiments of the present invention seek to reduce the resource consumption needed for detection of burn-in failure and remedy of the failure by automatically detecting failed devices, automatically diagnosing the cause of the failure, and automatically ordering replacement parts to aid in repair of a failed device. As will be more fully described below, embodiments use a machine-learning diagnosis system to determine the cause of the failure and how to fix the problem.

Figure 2:
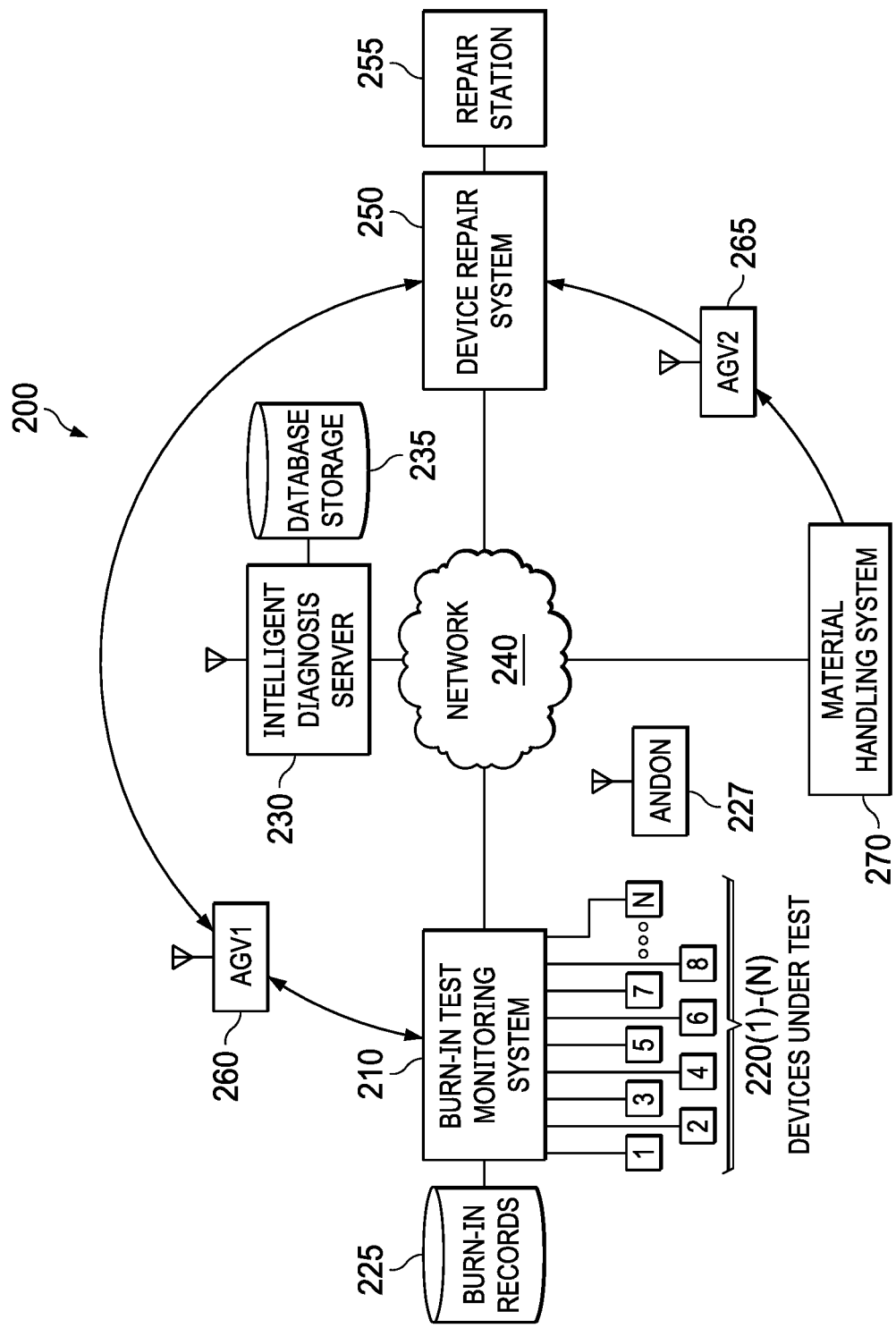
FIG. 2 is a simplified block diagram illustrating an intelligent diagnosis system for burn-in testing, in accord with embodiments of the present invention.

FIG. 2 is a simplified block diagram illustrating an intelligent diagnosis system 200 for burn-in testing, in accord with embodiments of the present invention. As described above, a burn-in test monitoring system 210 is utilized to manage burn-in testing of a set of devices under test 220(1)-(N). Each device under test can be an information handling system including numerous components such as, for example, processors, storage devices, memory, graphics cards, network communications cards, and the like. Alternatively, a device under test can be a specialized grouping of components for specific purposes (e.g., a network attached storage system, edge computing resources, media servers, and the like). Burn-in test monitoring system 210 stores information about each device under test 220 in a burn-in records database 225. Such information can include log files associated with each test conducted on a device under test, configuration files, and other information necessary to the tasks and analyzing the results.

Burn-in test monitoring system 210 is configured to monitor progress of each device under test 220 through a series of burn-in testing appropriate for each type of device under test. Burn-in test monitoring system 210 stores information associated with the burn-in testing in the log files stored in burn-in records database 225. When a device under test fails a burn-in test, burn-in test monitoring system is informed of such failure or can otherwise determine that a failure has occurred.

Upon determination of a failure of a device under test, burn-in test monitoring system 210 can inform intelligent diagnosis server 230 of the failure of the device under test via a communication link through network 240. Once informed of the failure of the device under test 220, intelligent diagnosis server 230 requests the log files and other information relevant to the burn-in test failure of the device under test and can store that information in database storage 235. In addition, intelligent diagnosis server 230 can directly inform personnel at the burn-in rack of the presence and identification of the failed device under test. In one example, intelligent diagnosis server 230 can wirelessly communicate device identification information to an Andon watch 227, or other mobile messaging device (e.g., pager, tablet, phone), and to notify burn-in personnel. This results in shorter dwell time of a failed device on the burn-in rack prior to sending the failed device to a repair station.

Intelligent diagnosis server 230 performs a diagnosis of the cause of the burn-in test failure of the device under test, using the information received from the burn-in test monitoring system utilizing a probabilistic machine learning approach. In certain embodiments, historical failure logs, configuration file records, and historical repair data are used to train a Naïve Bayes machine learning system to build a repair prediction model that can accurately determine a cause of new instances of burn-in failure among the devices under test. A set of tracked independent predictors associated with the components of the device under test (e.g., inputs, outputs, system model, failure information, system configuration (CPU model, DIMM size and type, hard disk drive size and type, PCI cards, and the like), system firmware version, repair code, and other types of components, etc.), environmental factors, length of testing, and the like, are utilized to train the machine learning system. Upon receipt of the information associated with a failed device under test, information associated with these variables is analyzed by the machine learning system to determine the highest probable causes of the failure. In certain embodiments, the top three probable causes of the failure are utilized to generate a recommended set of repair actions as guidance for subsequent steps in remedying the failure of the device under test.

After performing a diagnosis of the cause of the burn-in failure, intelligent diagnosis server 230 can provide, via network 240, the diagnosis information to device repair system 250 for use by a device repair technician upon receipt of the failed device under test. In addition, intelligent diagnosis server 230 can wirelessly communicate with an automated guided vehicle (AGV) 260 to report to the burn-in rack associated with the failed device under test to pick up the failed device and to transport the failed device to an assigned repair station 255. Further, intelligent diagnosis server 230 can order parts indicated for repair of the failed device in response to the failure diagnosis. The parts can be ordered from a material handling system 270. Personnel associated with materials handling can select the indicated parts and provide those to another AGV 265 to transport those parts to assigned repair station 255.

Once the failed device and the indicated parts arrive at repair station 255, a technician can use the diagnosis provided by intelligent diagnosis server 232 perform repairs upon the failed device. In certain embodiments, when multiple potential diagnoses are provided, the technician may need to determine which of the diagnoses are appropriate for the particular instance of failure. Nonetheless, by having suggested diagnoses and the parts to perform the repairs considering those diagnoses, repair of the device is greatly accelerated. The parallel actions of detection, diagnosis, parts requisition, and transportation of the failed device and indicated parts, can save significant time. In certain known examples, time from detection of the failure to repair of the device has been reduced to 45 minutes, or about 38% of the traditional system for effecting such repairs. This can result in significant reduction in the annual number of hours required to address burn-in failures and the overall cycle time for manufacturing the burn-in tested information handling systems.

Figure 3:
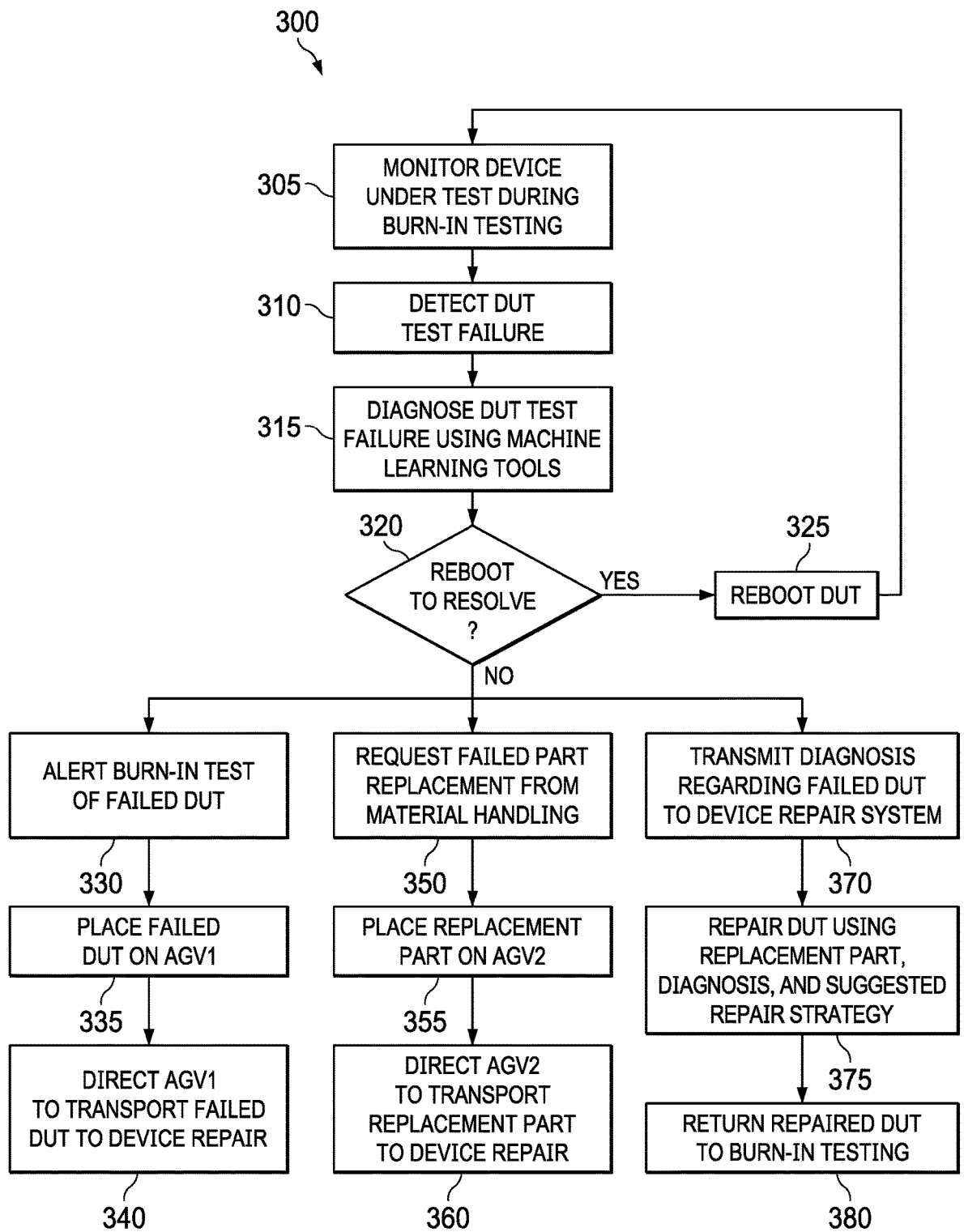
FIG. 3 is a simplified flow diagram illustrating the series of steps performed by intelligent diagnosis system, in accord with embodiments of the present invention.

FIG. 3 is a simplified flow diagram 300 illustrating the series of steps performed by intelligent diagnosis system 200, in accord with embodiments of the present invention. Devices under test (e.g., 220(1)-(N)) are monitored during burn-in testing (305). As discussed above, such monitoring can be performed by burn-in test monitoring system 210, or information can be directly provided from a burn-in rack to intelligent diagnosis server 230, which can perform the device monitoring directly. A DUT test failure is detected (310) by either the burn-in test monitoring system 210 or intelligent diagnosis server 230. Once the intelligent diagnosis server 230 detects the DUT test failure, or is informed of the test failure, the intelligent diagnosis server diagnosis the test failure using machine learning tools, such as Naïve Bayes, as discussed above (315). If, after diagnosis, a determination is made that a reboot can resolve the test failure (320), then the intelligent diagnosis server can instruct the burn-in test monitoring system to reboot the failed device under test (325) and burn-in testing can be restarted (305).

If a reboot of the device under test will not resolve the failure, then intelligent diagnosis or 230 can perform several tasks in parallel. Burn-in personnel can be alerted of the failed DUT (330). Such an alert can include information regarding the location of the failed DUT and, in some circumstances, the nature of the failure. Once the alert is received, the burn-in personnel can remove the failed device from the burn-in rack and place the failed device on an AGV for transport to a repair station (335). Intelligent diagnosis server 230 can direct the AGV to transport the failed DUT to a selected repair station (340).

In parallel to the process related to alerting the burn-in personnel of the failed device, intelligent diagnosis server 230 can also request replacement parts for the failed device from material handling (350). Such requests can be performed through server to server communication between intelligent diagnosis server 230 and material handling system 270, and can take the form of any protocol utilized by the two systems. Material handling personnel can then locate the replacement parts and place the replacement parts on another AGV for transport to the selected repair station (355). Intelligent diagnosis server 230 can direct the AGV to transport the replacement part to the selected device repair station (360).

In an additional parallel process, the intelligent diagnosis server can transmit the diagnoses related to the failed device to a device repair system (e.g., 250) associated with the selected device repair station (370). In addition, the intelligent diagnosis server can provide suggested repair strategies associated with the diagnosis. Alternatively, the device repair system can provide the suggested repair strategy in response to the received diagnosis, depending on the nature of the coupled systems and the distribution of the associated databases. The failed device can then be repaired by a device repair technician using the replacement parts, the provided diagnoses from the intelligent diagnosis server, and the suggested repair strategy provided by the intelligent diagnosis server (375). Once repaired, the repair device can be returned to burn-in testing or further burn-in testing can be performed at the device repair station (380).

Embodiments of the present invention provide a mechanism that improves the efficiency of the burn-in testing process for information handling systems. This is accomplished in part by automating diagnosis of the reason for device failure during burn-in using a machine learning procedure to correlate information regarding the failure with previous known failures. In addition, efficiencies are realized by alerting burn-in personnel of the failure and need for transport, requesting replacement parts from material handling, and providing diagnosis and suggested repair strategy to a device repair technician in parallel. In turn, the time to manufacture information handling systems is reduced, along with the resource cost associated with delays inherent in traditional methods of handling device burn-in failure. In addition, by automating diagnosis of device failure, the level of experience necessary for technicians to perform repairs on failed devices is reduced.

As will be appreciated by one skilled in the art, the present invention may be embodied as a method, system, or computer program product. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for remedying burn-in test failure of devices under test, the method comprising:
    monitoring status of one or more devices under burn-in testing;
    determining that a device under test (DUT) of a first type of the one or more devices under burn-in testing has failed one or more burn-in tests; and
    diagnosing one or more causes of the failure of the one or more burn-in tests by the DUT of the first type, wherein said diagnosing is performed using a probabilistic machine learning system trained from a historical set of burn-in test failure data of devices of the first type, the historical set of burn-in test failure data comprising historical failure logs, configuration file records and historical repair data;
    transmitting instructions to an automated guided vehicle (AGV) to report to a burn-in rack associated with the failed DUT and to transport the failed DUT to a selected device repair station; and,
    transporting the failed DUT to the selected device repair station via the AGV.

2. The method of claim 1, wherein
    the DUT of the first type comprises a first set of components; and
    the failure of the one or more burn-in tests by the DUT of the first type is associated with one or more components of the first set of components.

3. The method of claim 1, wherein the probabilistic machine learning system comprises a Naïve-Bayes classifier.

4. The method of claim 1 further comprising:
    instructing the failed DUT to reboot in response to said diagnosing.

5. The method of claim 1 further comprising, in response to said diagnosing, performing one or more of:
    alerting a burn-in test center of the failed DUT;

requesting one or more failed component replacements from a material handling system; and transmitting the diagnosis regarding the failed DUT to a device repair system.

6. The method of claim 5, wherein said alerting, requesting, and transmitting are performed in parallel.

7. The method of claim 5, wherein said alerting comprises:

transmitting an identification of the failed DUT to a burn-in test personnel.

8. The method of claim 7, wherein said alerting further comprises:

transmitting the identification of the failed DUT to a mobile device associated with the burn-in test personnel.

9. The method of claim 5, wherein said requesting the one or more failed component replacements comprises:

determining recommended repair strategy in response to said diagnosing;

determining recommended replacement components associated with the recommended repair strategy; and transmitting an identifier of the recommended replacement components to the material handling system.

10. The method of claim 9 further comprising;

transmitting instructions to a second automated guided vehicle (AGV) to transport the replacement components to the selected device repair station; and, transporting the replacement components to the selected device repair station via the second ACV.

11. The method of claim 5, wherein said diagnosing comprises:

identifying one or more failed components of the failed DUT using a log file associated with burn-in testing of the failed DUT as an input to the probabilistic machine learning system; and identifying one or more repair strategies for the failed DUT in response to said identifying the one or more failed components.

12. The method of claim 11 further comprising:

displaying the diagnosis at the selected device repair station, wherein the failed DUT and replacement components are transported to the selected device repair station.

13. The method of claim 1 further comprising:

selecting the device repair station for the failed DUT.

14. A system comprising:

a processor;

a data bus coupled to the processor;

a network interface, coupled to the data bus and a network, and configured to communicate via the network with a burn-in test monitoring system, a material handling system, and a device repair system, wherein the burn-in test monitoring system is coupled to one or more devices under burn-in testing, and the devices under burn-in testing each comprise one or more components; and a non-transitory, computer-readable storage medium embodying computer program code, the non-transitory, computer-readable storage medium being coupled to the data bus, the computer program code interacting with a plurality of computer operations and comprising instructions executable by the processor and configured to:

monitor status of the one or more devices under burn-in testing, determine that a device under test (DUT) of a first type of the one or more devices under testing has failed one or more burn-in tests, diagnose one or more causes of the failure of the one or more burn-in tests by the DUT of the first type, wherein said diagnosing is performed using a probabilistic machine learning system trained from a historical set of burn-in test failure data of devices of the first type, the historical set of burn-in test failure data comprising historical failure logs, configuration file records and historical repair data;

transmit instructions to an automated guided vehicle (AGV) to report to a burn-in rack associated with the failed DUT and to transport the failed DUT to a selected device repair station; and, transport the failed DUT to the selected device repair station via the AGV.

15. The system of claim 14 further comprising:

a machine learning accelerator processor, coupled to the data bus, and configured to execute instructions configured for the probabilistic machine learning system.

16. The system of claim 15, wherein the probabilistic machine learning system comprises a Naïve-Bayes classifier.

17. The system of claim 14 wherein the computer program code comprises further instructions executable by the processor further configured to:

alert, using the network interface, the burn-in test monitoring system of the failed DUT;

request, using the network interface, one or more failed component replacements from the material handling system; and transmit, using the network interface, the diagnosis regarding the failed DUT to the device repair system.

18. The system of claim 17 wherein the instructions configured to request one or more failed component replacements comprise further instructions executable by the processor configured to determine recommended repair strategy in response to said diagnosing;

determine recommended replacement components associated with the recommended repair strategy; and transmit, using the network interface, an identifier of the recommended replacement components to the material handling system.

19. The system of claim 17 wherein the instructions configured to diagnose the one or more causes of the failure of the one or more burn-in tests by the DUT comprise further instructions executable by the processor configured to identify one or more failed components of the failed DUT using a log file associated with the burn-in testing of the failed DUT as an input to the probabilistic machine learning system; and identify one or more repair strategies for the failed DUT in response to said identifying the one or more failed components.

* * * * *